United States Patent [19]
Zheng

[11] Patent Number: 5,838,744
[45] Date of Patent: Nov. 17, 1998

[54] HIGH SPEED MODEM AND METHOD HAVING JITTER-FREE TIMING RECOVERY

[75] Inventor: Baohua Zheng, St. Louis, Mo.

[73] Assignee: TALX Corporation, St. Louis, Mo.

[21] Appl. No.: 735,139

[22] Filed: Oct. 22, 1996

[51] Int. Cl.⁶ ........................................................ H04L 7/02
[52] U.S. Cl. ............................ 375/355; 375/234; 375/343; 375/222; 364/724.2
[58] Field of Search ....................................... 375/222, 229, 375/230, 232, 234, 343, 344, 355, 371; 364/724.2, 724.19

[56] References Cited

U.S. PATENT DOCUMENTS

| 4,899,366 | 2/1990 | Davis et al. | 375/14 |
| 5,414,732 | 5/1995 | Kaufmann | 375/232 |
| 5,517,526 | 5/1996 | Caudron et al. | 375/232 |

OTHER PUBLICATIONS

CCITT of International Telecommunication Union, "A Duplex Modem Operating at Data Signalling Rates of up to 14 400 bit/s for Use on the General Switched Telephone Network and on Leased Point–to–Point 2–Wire Telephone–Type Circuits," Recommendation V.32 bis, 1991, pp. 1–22.

Bingham, "The Theory and Practice of Modem Design," John Wiley & Sons, 1988, Chapter 7, pp. 189–236.

*Primary Examiner*—Don N. Vo
*Assistant Examiner*—Amanda T. Le
*Attorney, Agent, or Firm*—Senniger, Powers, Leavitt & Roedel

[57] ABSTRACT

An apparatus and method for reliable and jitter-free timing recovery in high speed modems which utilizes the correlations of the received data signal points and the demodulated baseband signal samples feeding into a fractionally-spaced adaptive equalizer. This correlation based approach bypasses calculation of the exact transmitter symbol rate as required in traditional timing recovery methods. Also, the receiver timing adjustments are done via the transformed domain by shifting the taps of the adaptive equalizer. No time domain signal sample interpolation is necessary, so that truly jitter-free timing recovery is realized.

14 Claims, 7 Drawing Sheets

HIGH SPEED MODEM AND METHOD HAVING JITTER-FREE TIMING RECOVERY

BACKGROUND OF THE INVENTION

The invention generally relates to timing recovery in high speed modems and, in particular, a jitter free approach which utilizes the correlations of the demodulated baseband signal samples and the received data signal points in the signal space diagram.

In high speed modems such as used for data, fax and wireless communications, the task of timing recovery is to synchronize the receiver data (symbol) rate to that of the transmitter so that the data transmission can be carried out successfully. Because no symbol rate clock is transmitted in the modulated signal, the receiver must derive the transmitter symbol rate from the incoming signal and be able to synchronize itself to that rate. Obviously, reliable timing recovery is a key part of any modem design and performance of the timing recovery circuits or algorithm can directly affect the bit-error-rate of the receiver.

There are two phases of timing recovery in high speed modems: the initial training phase and the steady-state phase. Training phase timing recovery is performed typically at the beginning of a line connection and is usually less of a problem because of the specially designed training signals which are transmitted during the training. Steady-state phase timing recovery, generally referred to as timing recovery in the literature, kicks in when the training process is complete. How to achieve reliable, jitter-free and simple to implement timing recovery in the steady-state phase has been a rather challenging task in modem designs.

In theory, timing recovery starts with deriving the transmitter symbol rate, which can be calculated from either the passband signal (the incoming modulated signal) or the baseband signal (the signal after demodulation), and then proceeds to adjust the receiver symbol rate accordingly. So, there are two related tasks: a) calculating the transmitter symbol rate, and b) adjusting the receiver timing. According to the prior art approaches used in the past, most available timing recovery methods can be generally classified into two categories: traditional and non-traditional.

In traditional methods, such as band-edge filtering and phase-locked loops (PLL), the basic idea is to first calculate the exact transmitter symbol rate. This can be a complex and time-consuming task to be carried out through either a hardware implementation or a software algorithm, and the result may not be very accurate. On the other hand, in adjusting the receiver timing, traditional methods focus on the "time domain" adjustment of the signals. Examples of such methods are sampling phase adjustment in the A/D convertor, sample rate adaptation and various time domain interpolations of the passband or baseband signal samples. Those methods require either special hardware or heavy computations in the software algorithm. And, because time domain adjustment directly interferes with the phase of the signal which is critical in almost all high speed modulation schemes, these methods often result in certain degrees of jitter in the signals in the receiver.

Non-traditional methods use totally different approaches toward solving each of the tasks involved in timing recovery. First, instead of calculating the exact transmitter symbol rate, a much simpler and more robust "timing indicator" is calculated. It determines whether the receiver symbol rate is slower or faster relative to the transmitter. Examples of such timing indicators use the peak position of the correlations of the baseband signal and the received data points, and a derivation from where it monitors the dominating taps of the adaptive equalizer. Second, in adjusting the receiver timing, the non-traditional method completely avoids time domain interpolation or manipulation of the signal samples. Instead, it performs any timing adjustment in the "transformed domain", for example, by shifting and interpolating the tap values of the adaptive equalizer as in the new method presented below. The major advantages are that the signal phases are unchanged and that truly jitter-free timing adjustment can easily be achieved. An example of non-traditional timing recovery is found in U.S. Pat. No. 4,899,366, the entire disclosure of which is incorporated herein by reference.

As most of the traditional methods for timing recovery were developed in a time when modems were built with basically analog hardware components, some of the methods, while good for pure hardware or hardware assisted implementations, are not convenient to implement in pure digital signal processing (DSP) algorithms. Software techniques such as fractionally spaced adaptive equalizers, while becoming commonplace in high speed modems today, were a luxury to use then because of lack of available DSP resources. Fractionally spaced adaptive equalizers offer a great deal of benefits, e.g., they make the optimal sampling phase of the signals unimportant. There is a need for a simple, reliable and truly jitter-free timing recovery method and modem which can be implemented in pure software form and which can be effectively designed. There is also a need for a correlation based timing indicator which is non-oscillatory, very robust and more accurate than the one which is based on the dominating taps of the adaptive equalizer. There is also a need for a system which combines non-traditional timing recovery methods to offer higher accuracy, higher reliability and simplicity of design.

SUMMARY OF THE INVENTION

It is an object of this invention to provide a timing recovery method and modem which meets the above noted needs and is very accurate, reliable and jitter-free.

In one form, the invention comprises a modem receiver for recovering a data signal $d(n)$ from a complex baseband signal, the data signal having a transmitter symbol rate. The receiver includes a sampler for sampling the complex baseband signal at a fixed sample clock rate substantially equal to twice the transmitter symbol rate to generate baseband samples $x(n)$. The receiver also includes a fractionally spaced adaptive equalizer for processing the samples $x(n)$ in time coordination with the fixed sample clock rate, the equalizer having adjustable taps including a leading tap, a trailing tap and middle taps between the leading tap and the trailing tap, the equalizer taps being used in filtering the samples $x(n)$ to generate equalized output samples $y(n)$. The receiver also includes a down-sampler by a factor of two which discards every other sample of $y(n)$ to generate candidate data samples $y'(n)$ and decision logic and a decoder for extracting the data samples $d(n)$ from $y'(n)$ at a receiver symbol rate which equals the sample rate of $y'(n)$. The adaptive equalizer shrinks the leading and the trailing taps to zero while updating the middle taps in response to an error signal representative of the difference between $d(n)$ and $y'(n)$ so that the mean-squared error of the error signal is minimized. The receiver also includes a timing indicator utilizing correlations $E[X*d]$ of the baseband signal samples $x(n)$ and the extracted data samples $d(n)$ for providing a timing indicator output signal indicating the speed of the receiver symbol rate relative to the transmitter symbol rate, where $X=X(n)=[x_0, x_{-1}, x_{-2}, \ldots, x_{-N}](n)$ is a vector of the N baseband samples in the delay line of the adaptive equalizer. The receiver also includes a timing recovery control initiating timing recovery events to advance or retard the equalized output samples y(n) by shifting the adaptive equalizer taps left or right and by advancing or retarding the equalizer output in response to the timing indicator output signal whereby the receiver symbol rate is increased or decreased to correspond to the transmitter symbol rate without introducing any jitter in the equalized output samples y(n).

In another form, the invention also includes a method for recovering a data signal d(n) from a complex baseband signal, the data signal having a transmitter symbol rate, the method comprising the steps of:

sampling the complex baseband signal at a fixed sample clock rate substantially equal to twice the transmitter symbol rate to generate baseband samples x(n);

processing the samples x(n) in time coordination with the fixed sample clock rate;

filtering the samples x(n) using a fractionally spaced adaptive equalizer with adjustable taps including a leading tap, a trailing tap and middle taps between the leading tap and the trailing tap to generate equalized output samples y(n);

down-sampling by a factor of two by discarding every other sample of y(n) to generate candidate data samples y'(n);

extracting the data samples d(n) from y'(n) at a receiver symbol rate which equals the sample rate of y'(n);

shrinking the leading and the trailing taps of the adaptive equalizer to zero while updating the middle taps of the adaptive equalizer in response to an error signal representative of the difference between d(n) and y'(n) so that the mean-squared error is minimized;

utilizing correlations E[X*d] of the baseband signal samples x(n) and the extracted data samples d(n) for providing a timing indicator output signal indicating the speed of the receiver symbol rate relative to the transmitter symbol rate, where $X=X(n)=[x_0, x_{-1}, x_{-2}, \ldots, x_{-N}](n)$ is a vector of the N baseband samples in the delay line of the adaptive equalizer; and initiating timing recovery events to advance or retard the equalized output samples y(n) by shifting the adaptive equalizer taps left or right and by advancing or retarding the output in response to the timing indicator output signal whereby the receiver symbol rate is increased or decreased to correspond to the transmitter symbol rate without introducing any jitter in the equalized output samples y(n).

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

The system according to the invention employs a nontraditional approach for timing recovery which bypasses calculation of the exact transmitter symbol rate and which avoids interpolation of time domain signal samples. One key component is the definition of a simple to calculate and reliable correlation-based timing indicator which determines whether the receiver symbol rate is faster or slower relative to the transmitter. Receiver timing is then adjusted accordingly. This modem of the invention extends this correlation based method for timing recovery in three important ways: 1) it takes advantage of the single-peak property of the correlations which property will be show below by analytical analysis; 2) it introduces a jitter-free approach for adjusting the receiver symbol rate via the "transformed domain" by shifting and interpolating the adaptive equalizer taps; and 3) it is independent of Trellis coding which has no effect on this timing recovery method. Thus, a complete method and apparatus for reliable jitter-free timing recovery is presented which can be readily designed into DSP algorithms. Before proceeding with a detailed description of the timing recovery method and modem according to the invention, the first and second points will be established. The third point will be addressed after the description of the timing recovery method and modem according to the invention.

Single Peak Property of the Correlations

What follows is a rigorous proof that the correlations of the baseband samples and the received data points exhibit only a single peak.

Let $X(n)=[x_0, x_{-1}, \ldots, x_{-k+1}, x_{-k}, x_{-k-1}, \ldots, x_{-N}](n)$ be the N baseband samples in the delay line of the adaptive equalizer 104, and let d(n) be the received data point at the output of the decision logic 108. The correlations of X(n) and d(n), which are a vector with N components, are defined as follows:

$$\begin{aligned} R(n) &= E[X(n)^*d(n)] \\ &= E[x_0(n)^*d(n), x_{-1}(n)^*d(n), x_{-2}(n)^*d(n), \ldots, \\ &\quad x_{-N}(n)^*d(n)], \text{ or} \\ &= [r_0, r_1, \ldots, r_k, \ldots, r_N], \text{ or} \\ R(n) &= \sum_{m=0}^{M-1} X(n+m)^*conj(d(n+m))/M \end{aligned} \tag{1}$$

where "conj" stands for complex conjugation and M is a selected block length for calculating the correlations.

Figure 4A:
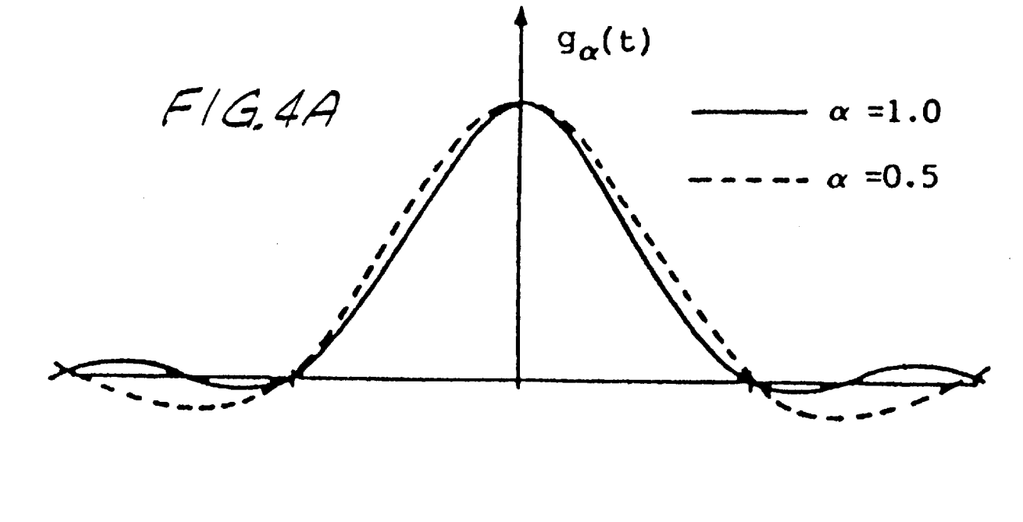
FIG. 4A illustrates the impulse response of a raised-cosine filter for different roll-off factors.
Figure 4B:
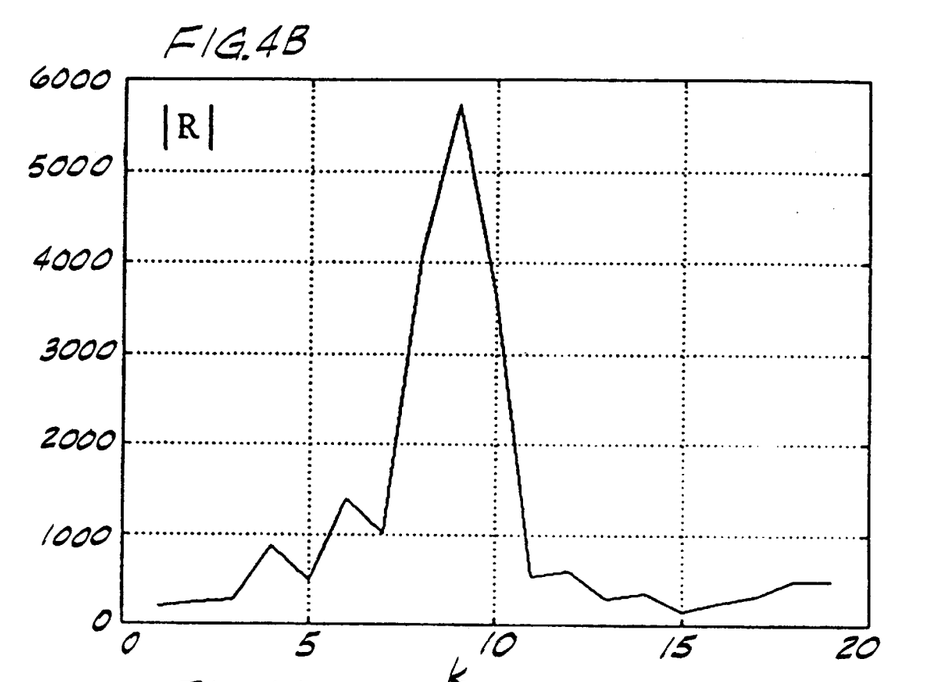
FIG. 4B illustrates that the correlation between the baseband samples x(n) and the received data points d(n) will show only a single peak at some index k.
Figure 4C:
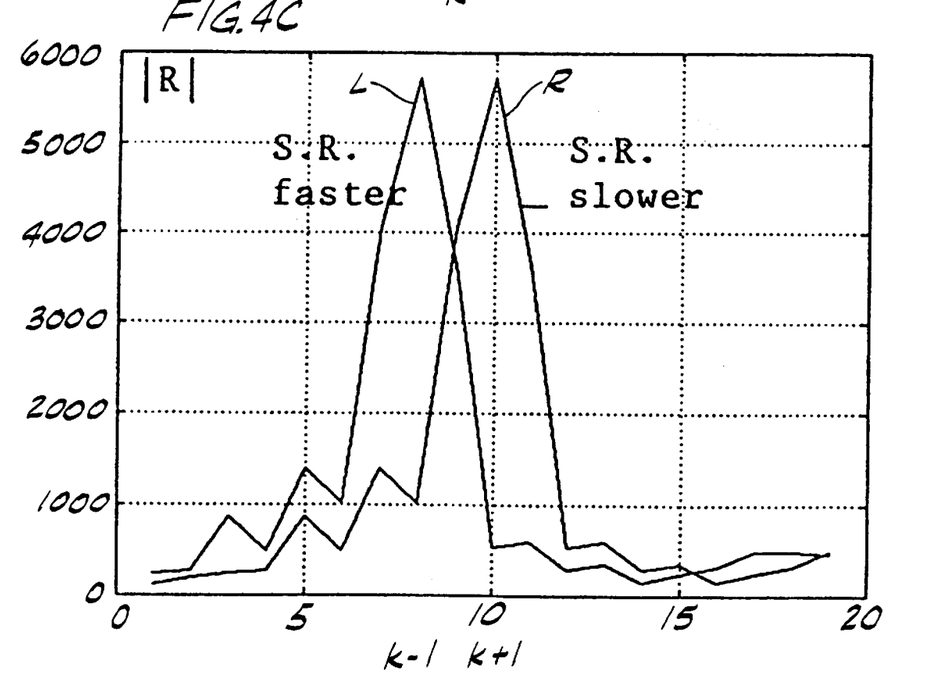
FIG. 4C illustrates that the correlation peak at index k as shown in FIG. 4B will gradually shift when the receiver symbol rate is slower or faster than the transmitter symbol rate.

The correlations R(n) have a single peak in amplitude close to the center of the indices, k, as shown in FIG. 4B. This peak position can be used as a timing indicator as follows: If the peak position shifts to the left, i.e., from index k to k−1 as illustrated by L in FIG. 4C, then the receiver symbol rate is faster than the symbol rate of the transmitter. Otherwise, if the peak position shifts to the right, i.e., from index k to k+1 as illustrated by R in FIG. 4C, then the receiver symbol rate is slower than the symbol rate of the transmitter.

The single amplitude peak of the correlations R(n) can be shown analytically as follows. The entire transmission channel can be modeled by a transfer function H(z) which combines the raised-cosine pulse shaping filters in both the transmitter and the receiver, and the passband channel distortions (from modulation, transmission and demodulation processes, linear and passive in nature), as illustrated in FIG. 2C. Note that H(z) would equal a raised-cosine pulse shaping filter if there is no passband channel distortion. With passband channel distortions, the transfer function H(z) will deviate from that of a raised-cosine pulse shaping filter.

Let u(n) be the symbol pulses to be transmitted in the transmitter. The baseband signal x at the receiver's demodulator output is, therefore, x(z)=H(z)*u(z), or $$x(n) = H^{t*}U(n) \tag{2}$$

in time domain representation, where $H=[h_0, h_1, \ldots, h_m]^t$ is the impulse response of H(z) and $U(n)=[u_0, u_{-1}, \ldots, u_{-m}](n)$. Using (2), the correlations R(n) in (1) can be rewritten as $R(n)=E[X(n)*d(n)]$, or $$R(n)=E\{[H^{t*}U_0, H^{t*}U_{-1}, \ldots, H^{t*}U_{-N}](n)*d(n)\} \tag{3}$$

where $U_i=[u_i, u_{i-1}, \ldots, u_{i-m}](n)$, i=0,−1, . . . ,−N. Now, d(n) is a copy of the transmitted symbols u(n) if the receiver is decoding correctly, and u(n) is a pseudo random sequence generated by the transmitter scrambler. The signals $U_i$, i=0,−1, . . . ,−N and d(n) are either uncorrelated or correlated at only one time index, −k, in the range of (0, −N−m). Without loss of generality, assume m=N. Therefore, (3) becomes $$R(n)=[h_m, h_{m-1}, \ldots, h_k, \ldots, h_1, h_0]*b \tag{4}$$

where $b=E[u_{-k}*d]$=complex constant. Equation (4) shows that the correlations R(n) are the impulse response of the transmission channel transfer function times a constant. Because the impulse response H of the transmission channel resembles that of a raised-cosine filter as depicted in FIG. 4A, the correlations R(n) have a single amplitude peak. It is well known that channel distortions will generally increase the inter-symbol interference. Such distortions will cause the zero-crossing points of the impulse-response to shift away from the baud interval points. But they will not change the basic shape and the single-peak property of the impulse-response of the overall baseband channel.

By noting that the received data point d(n) can be decomposed into d(n)=y(n)+e(n) where e(n) is the error of the received data point which is statistically orthogonal to the baseband signal x when the adaptive equalizer is converged, i.e., E[X(n)*e(n)]=0, alternatively, the correlations R(n) can be calculated by using the adaptive equalizer output y(n) instead of d(n):

$$\begin{aligned} R(n) &= E[X(n)*d(n)] \\ &= E[X(n)*y(n)] + E[X(n)*e(n)] \\ &= E[X(n)*y(n)], \text{ or} \end{aligned} \tag{5}$$

$$R(n) = \sum_{m=0}^{M-1} X(n+m)*conj(y(n+m))/M$$

Since the timing indicator defined above is based on correlations of well-defined stationary signals, it is both very robust and accurate. Furthermore, because the amplitude peak of the correlations are strictly non-oscillatory, that is, the peak will shift slowly and steadily to only one direction, the defined timing indicator has the following two importance properties: 1) It never momentarily gives the wrong indication regarding the symbol rate; and 2) it will give the precise moment when the receiver symbol rate has shifted half a baud relative to the transmitter and timing adjustment is necessary. In comparison, prior art methods which rely on positions of the dominating taps of the adaptive equalizer can give false indications from time to time. Part of the problem has been the lack of a rigorous proof, as presented above, that the taps of the adaptive equalizer exhibit only a single peak.

In actual implementation, only three correlation components around the peak position k need to be calculated. The initial peak position k can be established in the training process. The required computation, then, is reduced to a minimum.

Jitter-Free Adjustment of the Receiver Symbol Rate

Once the timing indicator is calculated, the remaining task in timing recovery is to adjust the receiver timing accordingly. In this respect, traditional methods attempt to directly manipulate the signal samples in the "time domain", which causes direct interference to the signal phase. No matter how the manipulation is done, it results in a signal with certain degree of phase jitter. In high speed modulation systems where the phase information is becoming increasingly critical, such phase jitter could easily lead to erroneous decisions in the receiver. A new approach for adjusting the receiver timing which does not directly modify or interfere with the signal phase is needed. This need lead to the development of the jitter-free timing recovery method and modem described herein. This invention performs timing adjustment via the "transformed domain" by manipulating the transformed variables, in this case, by shifting and interpolating the adaptive equalizer taps.

Let $W(n)=[w_0, w_1, \ldots, w_{k-1}, w_k, w_{k+1}, \ldots, w_N](n)$ be the taps (coefficients) of the fractionally spaced adaptive equalizer. The following rules apply to the adaptive equalizer: a) The first tap $w_0$ and the last tap $w_N$ are fixed at zero normally except during the timing recovery process, and b) only the remaining middle taps $w_1, \ldots, w_{k-1}, w_k, w_{k+1}, \ldots, w_{N-1}$ are allowed to be updated in the adaptation process. Note that for a T/2 fractionally spaced adaptive equalizer, the input baseband sample x(n) comes into the adaptive equalizer at T/2 intervals, or two times the baud rate which is the local clock rate underlying the receiver. Thus, one baseband sample is consumed every clock tick, and one data point is decoded every two clock ticks. Using the timing indicator developed above, the new timing recovery method and modem can be implemented as follows:

Case 1, when the receiver symbol rate is faster, then perform the following steps:

f1) Shift W(n) to the right such that $W(n)=[0, w_0, w_1, \ldots, w_{k-1}, w_k, w_{k+1}, \ldots, w_{N-1}](n)$;

f2) Input a sample to the adaptive equalizer, but suspend the rest of the receiver for one clock tick;

f3) Gradually bring the trailing tap of W(n) to zero.

Case 2, when the receiver symbol rate is slower, then perform the following steps:

s1) Shift W(n) to the left such that W(n)=[$w_1, \ldots, w_{k-1}, w_k, w_{k+1}, \ldots, w_N, 0$](n) ;

s2) Without inputting a sample to the adaptive equalizer, run the receiver for an extra clock tick;

s3) Gradually bring the leading tap of W(n) to zero.

Figure 3A:
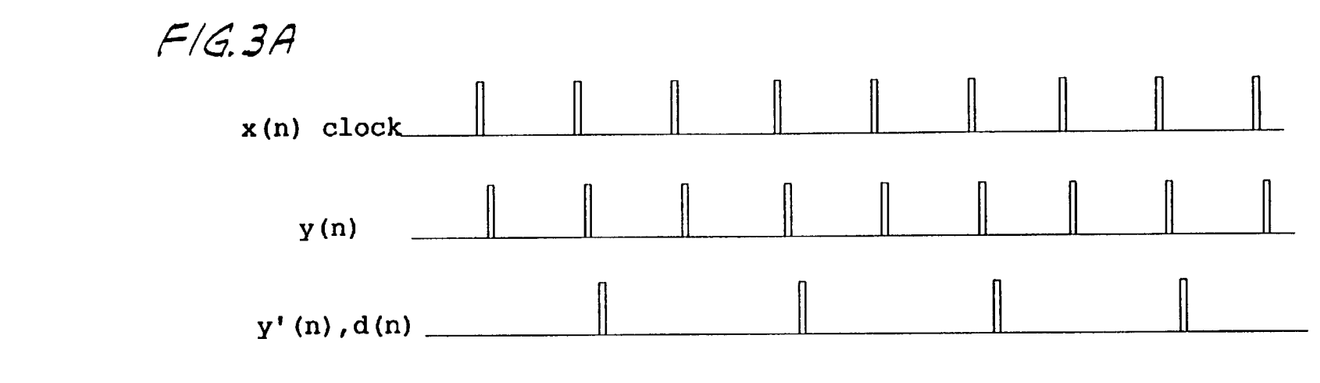
FIG. 3A is a timing diagram illustrating normal signal timing.
Figure 3B:
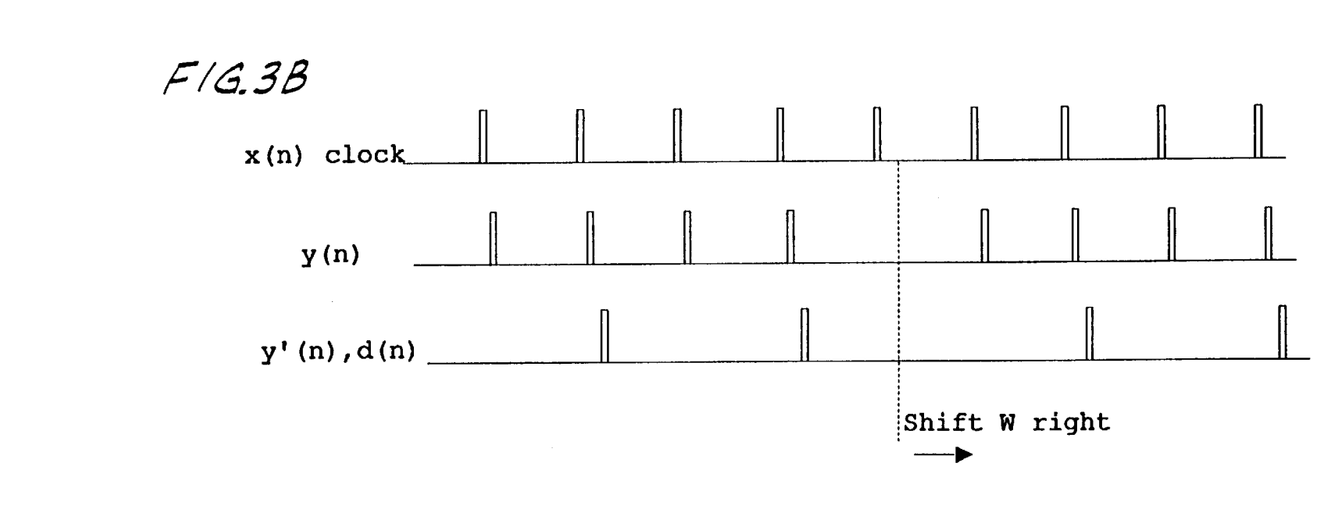
FIG. 3B is a timing diagram illustrating the timing recovery process to decrease the receiver symbol rate.
Figure 3C:
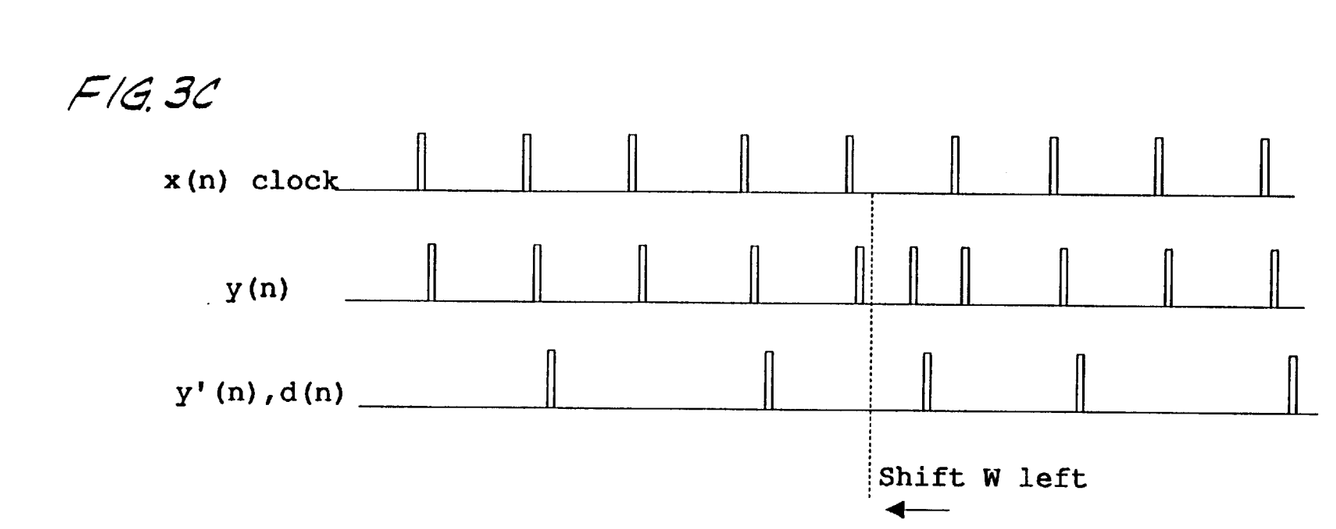
FIG. 3C is a timing diagram illustrating the timing recovery process to increase the receiver symbol rate.

The above timing recovery processes are further illustrated by timing diagrams. To compensate in case 1, the taps (coefficients) W of the fractionally spaced adaptive equalizer are shifted to the right and the equalizer output sample y(n) in the receiver is retarded to decrease the receiver symbol rate. A comparison of FIGS. 3A and 3B illustrates this timing recovery event. The normal signal timing diagram of FIG. 3A illustrates that each x(n) clock pulse corresponds to a y(n) sample and every other y(n) sample corresponds to a data point d(n). When the equalizer output y(n) is retarded as shown in FIG. 3B, it causes a one pulse delay in d(n) relative to the x(n) clock thus decreasing the receiver symbol rate. To compensate in case 2, the taps (coefficients) W of the fractionally spaced adaptive equalizer are shifted to the left and the equalizer output sample y(n) in the receiver is advanced to increase the receiver symbol rate. A comparison of FIGS. 3A and 3C illustrates this timing recovery event. The normal signal timing diagram of FIG. 3A illustrates that each x(n) clock pulse corresponds to a y(n) sample and every other y(n) sample corresponds to a data point d(n). When the equalizer output y(n) is advanced as shown in FIG. 3C, it causes a one pulse advance in d(n) relative to the x(n) clock thus increasing the receiver symbol rate.

Because the leading and trailing taps of the adaptive equalizer are normally fixed at zero, the first two steps in the above timing recovery method merely realign the baseband signal samples to the shifted adaptive equalizer taps. None of the time domain signal sample is changed or modified. There is no interruption in the signal continuity of the output samples of the adaptive equalizer. The process so far is completely jitter-free. However, by so doing, the receiver symbol clock is retarded or advanced one clock tick. This accomplishes the purpose of receiver symbol rate adjustment.

The purpose of the third step is to return the shifted adaptive equalizer taps to the normal state where the leading and trailing taps are fixed at zero, so as to get ready for the next timing recovery event. The process to shrink the leading or the trailing tap to zero needs to be slow to spread out over many symbol times so as to avoid any added jitter to the normal output of the adaptive equalizer. In fact, since the leading and trailing taps are the least significant taps of the adaptive equalizer and their values are small compared to the dominating taps, it is totally possible to make the process slow enough so that the noise caused by shrinking the leading or trailing tap to zero is smaller than the random noise associated with updating the adaptive equalizer. In this case, there is no added timing or phase jitter at all from the above timing recovery process. Thus, jitter-free timing recovery is achieved.

The process to gradually shrink the leading or trailing tap of the adaptive equalizer to zero in the above timing recovery method and modem can be viewed as interpolation of the corresponding tap between non-zero and zero values. The interpolation is performed in the "transformed domain". Compared to traditional methods which interpolate the time domain signal samples, this new method and modem is much simpler to implement and requires far less computation. Plus, it offers truly jitter-free timing recovery in the receiver.

Timing Recovery Method and Modem of the Invention

Figure 1:
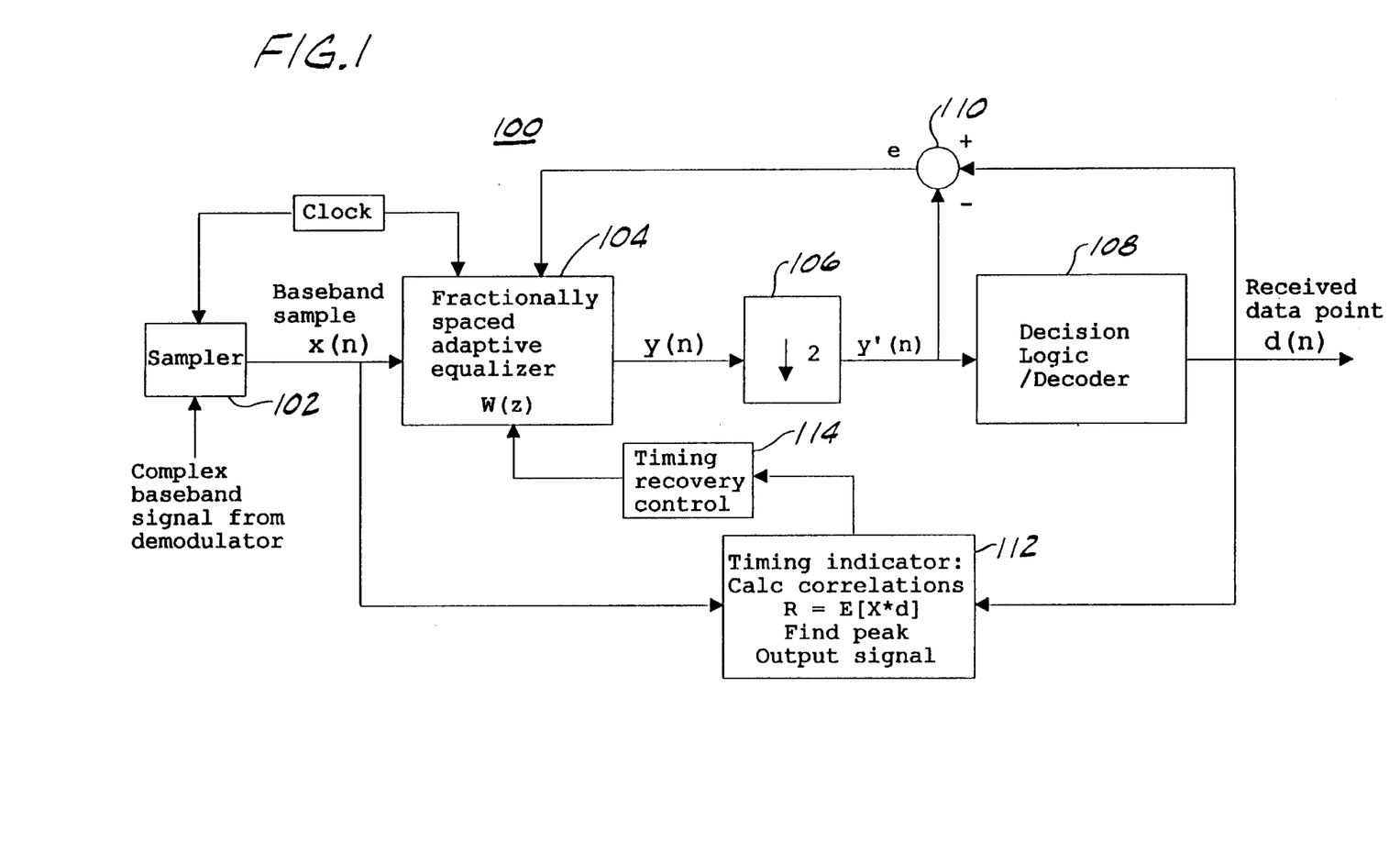
FIG. 1 is a simplified block diagram of a modem receiver according to the invention.
Figure 2A:
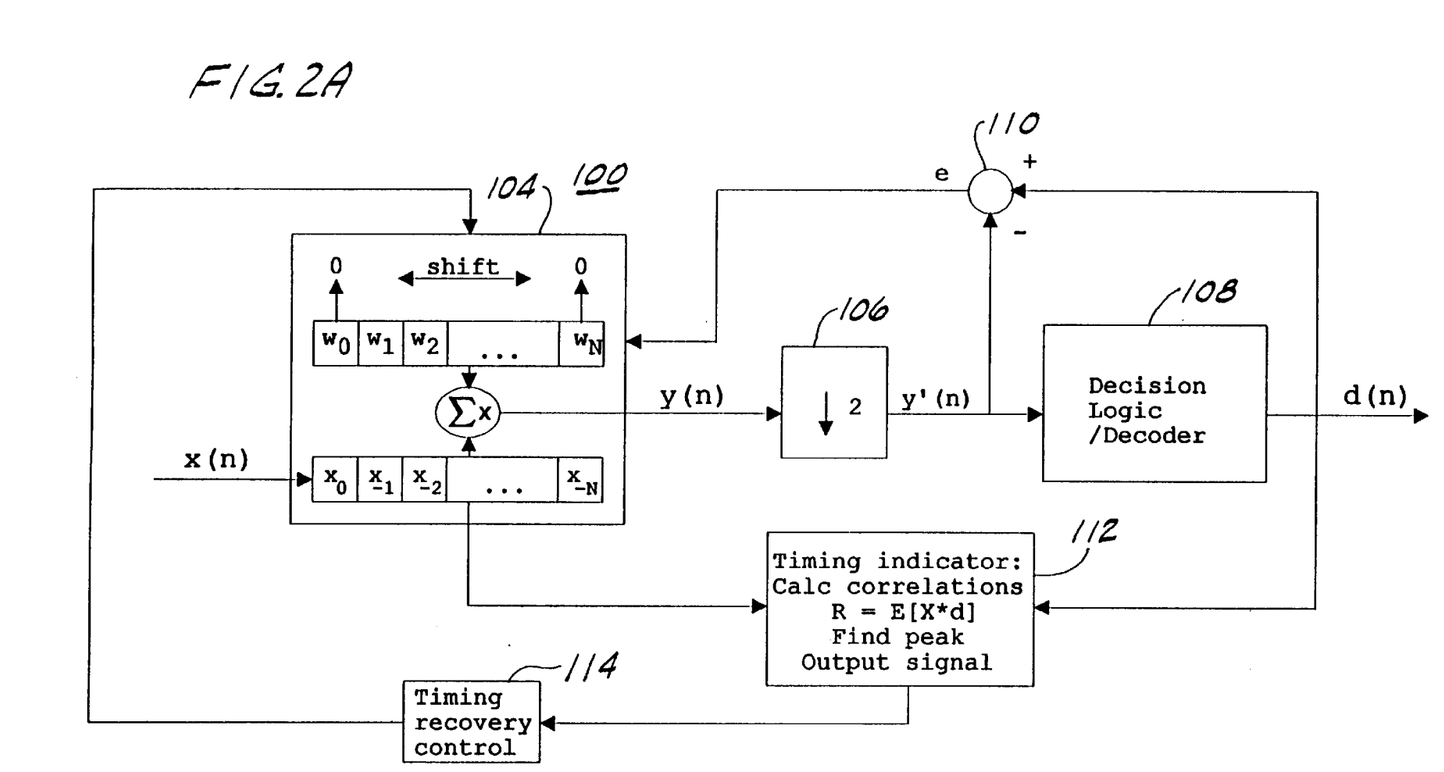
FIG. 2A is a block diagram of a modem receiver according to the invention expanded to show the details of the adaptive equalizer.

Now that it has been established by rigorous proof that the correlations of the baseband samples and the received data points exhibit only a single peak which can be used as a reliable timing indicator, and the jitter-free method to adjust the receiver timing has been described, we can proceed to FIGS. 1 and 2A wherein the invention is illustrated and implemented as a modem receiver 100 for recovering a data signal d(n) from a complex baseband signal, the data signal having a transmitter symbol rate. The complex demodulated baseband signal is sampled by a sampler 102 to produce a baseband signal x(n). The sampler 102 samples the complex baseband signal at a fixed sample clock rate substantially equal to twice the transmitter symbol rate to generate the baseband samples. The baseband signal x(n) is fed into a fractionally spaced adaptive equalizer 104 with fractionally spaced taps, W(z), which is a transversal finite-impulse-response (FIR) filter with taps W(n)=[$w_0, w_1, \ldots, w_{k-1}, w_k, w_{k+1}, \ldots, w_N$](n). The adaptive equalizer has adjustable taps including a leading tap, a trailing tap and middle taps between the leading tap and the trailing tap, the adaptive equalizer taps being used in filtering the samples x(n) in time coordination with the fixed sample clock rate to generate equalized output samples y(n). The output, y(n) of the adaptive equalizer is down-sampled by a down-sampler 106 by a factor of two such that the down-sampler discards every other sample of y(n) to generate candidate data samples y'(n) which then go through a decision logic/decoder 108 to produce a received data signal point, d(n), in the signal space diagram. The decision logic and decoder 108 extract the data samples d(n) from y'(n) at a receiver symbol rate which equals the sample rate of y'(n). While this real time processing is occurring, the adaptive equalizer 104 shrinks the leading and the trailing taps to zero while updating the middle taps in response to an error signal e as generated by a subtractor 110 representative of the difference between d(n) and y(n) so that the mean-squared error of the error signal is minimized. In particular, the adaptive equalizer 104 shrinks the leading tap $w_0$ to zero and the trailing tap $w_N$ to zero while updating the middle taps $w_1$–$w_{N-1}$ after each timing recovery event so that the leading and the trailing taps are zeros before the next timing recovery event occurs. In addition, the adaptive equalizer 104 shrinks the leading and the trailing taps to zero at a preset rate, such as a linear rate, so that the introduced noise in the equalized output samples y(n) is smaller than noise caused by updating the middle taps of the adaptive equalizer. For example, the preset rate may be as follows: shrink the leading or the trailing tap by a fixed step size of 0.1% to 1.0% of the starting amplitude of the tap for each adjustment of the middle taps.

Figure 2B:
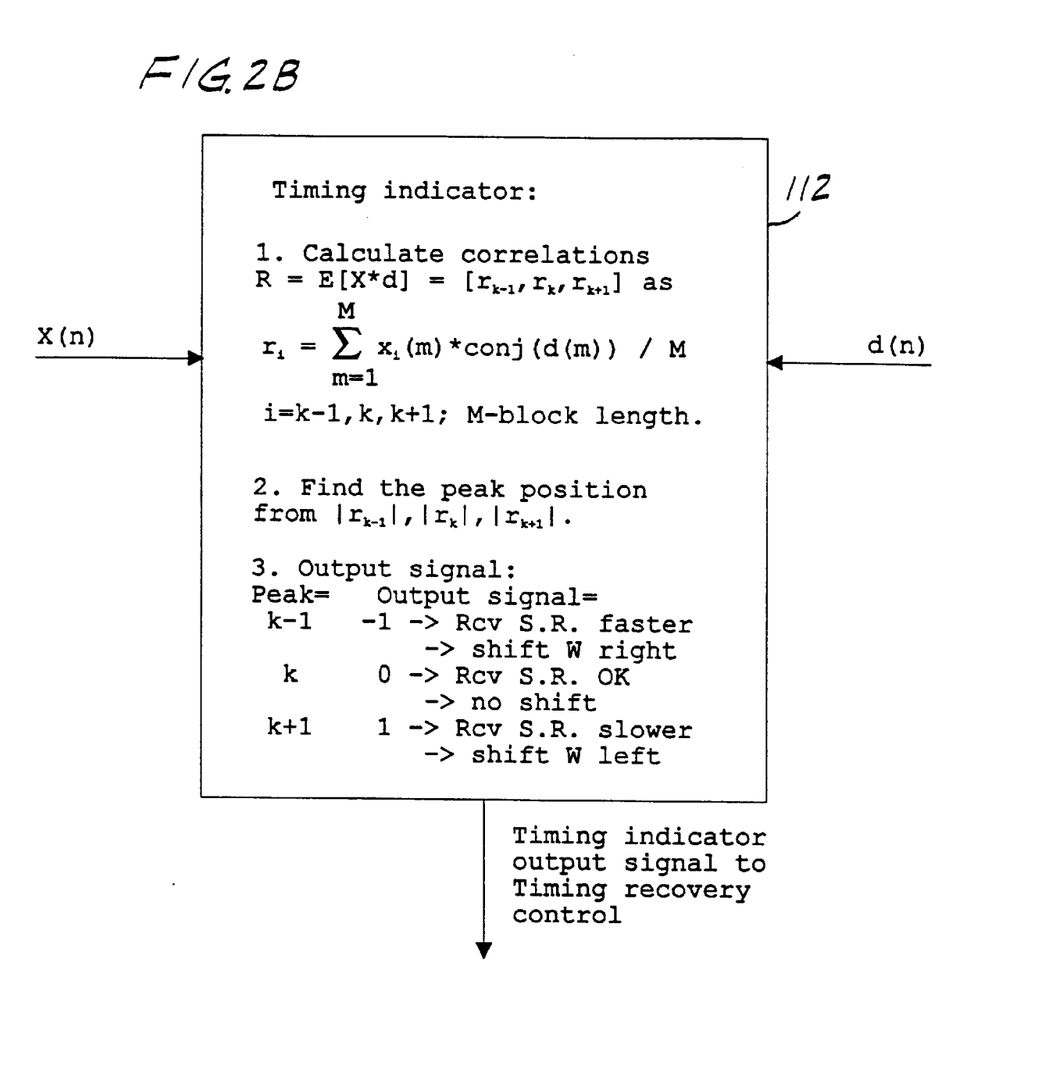
FIG. 2B is a block diagram illustrating the calculations of the timing indicator.
Figure 2C:
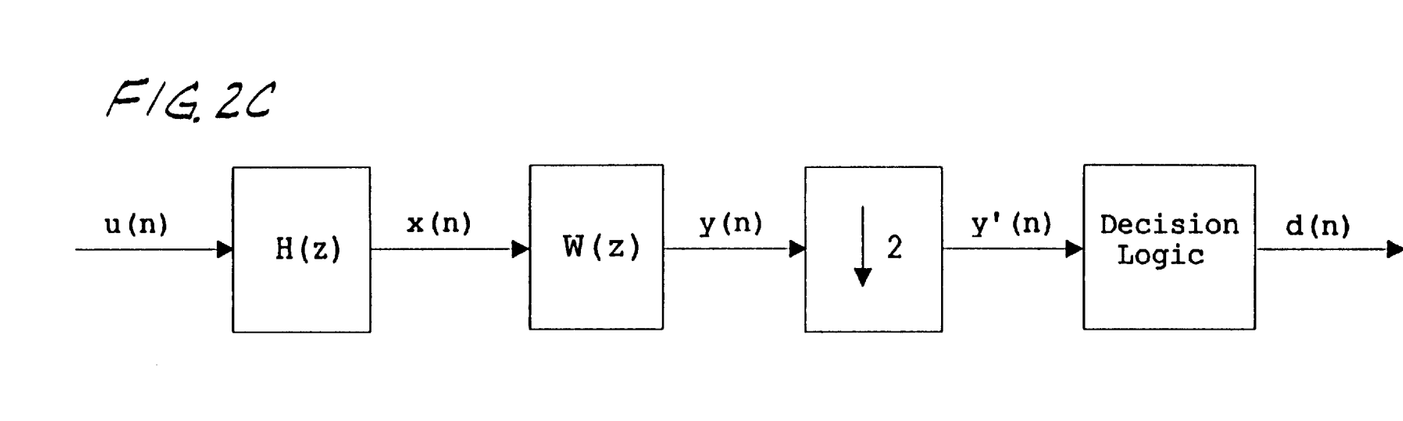
FIG. 2C is a block diagram illustrating the transfer function model for the transmission channel.

A timing indicator circuit 112, also illustrated in more detail in FIG. 2B, utilizes correlations E[X*d] of the baseband signal samples x(n) and the extracted data samples d(n) for providing a timing indicator output signal indicating the speed of the receiver symbol rate relative to the transmitter symbol rate, where X=X(n)=[$x_0, x_{-1}, x_{-2}, \ldots, x_{-N}$](n). Preferably, the timing indicator circuit 112 utilizes correlations E[X*d] calculated at three indices around the initial peak position k (see FIG. 4B) which is established during an initial training of a modem connection. The correlations E[X*d] can, alternatively, be calculated as the ensemble average of M products involving X(n) and d(n), with M being a block length providing reliable and timely correlation results. For example, M may be equal to 1200 to 2400 symbols which is one-half to one second at the V.32 and V.32bis standards. The timing indicator circuit 112 outputs a signal to activate a timing recovery control 114 when the amplitude peak of the calculated correlations E[X*d] has shifted away from the initial position k. The timing recovery control 114 initiates timing recovery events to advance or retard the equalized output samples y(n) by shifting to the left or right the taps of adaptive equalizer 104 and by advancing or retarding the equalizer output in response to the timing indicator output signal. As a result, the receiver symbol rate is increased or decreased to correspond to the transmitter symbol rate without introducing any jitter in the equalized output samples y(n).

In the case where a phase rotation is applied to y'(n), i.e., y'(n)*exp(j$\phi$(n)), before the decision logic to compensate for frequency offset in the carrier frequency, the received data point d(n) should be first de-rotated, i.e., d(n)*exp(−j$\phi$(n)), before it is used in the correlations calculations. How to calculate the rotation angle $\phi$(n) falls into the subject of carrier recovery and is out of the scope of this invention.

In summary, the timing recovery method according to the invention recovers a data signal d(n) from a complex baseband signal, the data signal having a transmitter symbol rate. The method comprises the steps of:

sampling the complex baseband signal at a fixed sample clock rate substantially equal to twice the transmitter symbol rate to generate baseband samples x(n);

processing the samples x(n) in time coordination with the fixed sample clock rate;

filtering the samples x(n) using a fractionally spaced adaptive equalizer 104 with adjustable taps including a leading tap, a trailing tap and middle taps between the leading tap and the trailing tap to generate equalized output samples y(n);

down-sampling by a factor of two by discarding every other sample of y(n) to generate candidate data samples y'(n);

extracting the data samples d(n) from y'(n) at a receiver symbol rate which equals the sample rate of y'(n);

shrinking the leading and the trailing taps to zero while updating the middle taps of the adaptive equalizer in response to an error signal representative of the difference between d(n) and y'(n) so that the mean-squared error is minimized;

utilizing correlations E[X*d] of the baseband signal samples x(n) and the extracted data samples d(n) for providing a timing indicator output signal indicating the speed of the receiver symbol rate relative to the transmitter symbol rate, where X=X(n)=[$x_0$, $x_{-1}$, $x_{-2}$, . . . , $x_{-N}$](n); and initiating timing recovery events to advance or retard the equalized output samples y(n) by shifting the adaptive equalizer taps left or right and by advancing or retarding the output in response to the timing indicator output signal whereby the receiver symbol rate is increased or decreased to correspond to the transmitter symbol rate without introducing any jitter in the equalized output samples y(n).

Other aspects of the method include the following. Preferably, the step of shrinking the leading or the trailing tap to zero occurs while updating the middle taps of the adaptive equalizer after each timing recovery event so that the leading and the trailing taps are zeros before the next timing recovery event occurs. Also, the step of shrinking the leading and the trailing taps to zero occurs at a preset rate such that the introduced noise in the equalized output samples y(n) is smaller than noise caused by updating the middle taps of the adaptive equalizer. The method may specifically include the step of outputting a signal to activate the timing recovery when the amplitude peak of the calculated correlations E[X*d] has shifted away from an initial position. In addition, the method may include the step of utilizing correlations E[X*d] calculated at three indices around an initial peak position k which is established during an initial training of a modem connection and the step of utilizing correlations E[X*d] calculated as the ensemble average of M products involving X(n) and d(n), with M being a block length providing reliable and timely correlation results.

Trellis Coding Independence

In a Trellis coded signal system where a set delay is involved in the decision logic 108, the method includes buffering the baseband samples to include a delay corresponding to the set delay. When Trellis coding is used, from the signal flow point of view, the only difference is that the decision logic 108 now contains m symbols of delay in decoding the received data point, where m is the number of frames used in the Viterbi algorithm. Because of this delay, the received data point, d(n), at the output of the decision logic should correspond to an input sample m symbols before, i.e., y(n−2m), and a vector X(n−2m) in the adaptive equalizer delay line where the sample rate is two times the baud rate. So, to compensate for the delay in the decision logic, X(n−2m) instead of X(n) should be used in both updating the adaptive equalizer coefficients and calculating the correlations R(n). Since the baseband signals are stationary random sequences, the decoding delay does not affect the value of the calculated correlations nor does it affect the timing recovery method and modem defined here. To implement this delay in a Trellis coded system, the adaptive equalizer 104 includes a delay line which is expanded to include a delay corresponding to the set delay in the decision logic so that a delayed version of X(n) is used in calculating the correlations E[X*d] as well as in updating the adaptive equalizer taps.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A modem receiver for recovering a data signal d(n) from a complex baseband signal, the data signal having a transmitter symbol rate, the receiver comprising:

means for sampling the complex baseband signal at a fixed sample clock rate substantially equal to twice the transmitter symbol rate to generate baseband samples x(n);

a fractionally spaced adaptive equalizer for processing the samples x(n) in time coordination with the fixed sample clock rate, said equalizer having adjustable taps including a leading tap, a trailing tap and middle taps between the leading tap and the trailing tap, the equalizer taps being used in filtering the samples x(n) to generate equalized output samples y(n);

a down-sampler by a factor of two which discards every other sample of y(n) to generate candidate data samples y'(n);

decision logic and a decoder for extracting the data samples d(n) from y'(n) at a receiver symbol rate which equals the sample rate of y'(n), said adaptive equalizer shrinking the leading and the trailing taps to zero while updating the middle taps in response to an error signal representative of the difference between d(n) and y'(n) so that the mean-squared error of said error signal is minimized;

a timing indicator utilizing correlations E[X*d] of the baseband signal samples x(n) and the extracted data samples d(n) for providing a timing indicator output signal indicating the speed of the receiver symbol rate relative to the transmitter symbol rate, where $X=X(n)=[x_0, x_{-1}, x_{-2}, \ldots, x_{-N}](n)$ is a vector of N baseband samples in the delay line of the adaptive equalizer; and a timing recovery control initiating timing recovery events to advance or retard the equalized output samples y(n) by shifting the adaptive equalizer taps left or right and by advancing or retarding the equalizer output in response to the timing indicator output signal whereby the receiver symbol rate is increased or decreased to correspond to the transmitter symbol rate without introducing any jitter in the equalized output samples y(n).

2. The receiver of claim 1 wherein the adaptive equalizer shrinks the leading and the trailing taps to zero while updating the middle taps after each timing recovery event so that the leading and the trailing taps are zeros before the next timing recovery event occurs.

3. The receiver of claim 1 wherein the adaptive equalizer shrinks the leading and the trailing taps to zero at a preset rate such that the introduced noise in the equalized output samples y(n) is smaller than noise caused by updating the middle taps of the adaptive equalizer.

4. The receiver of claim 1 wherein the timing indicator outputs a signal to activate the timing recovery control when the amplitude peak of the calculated correlations E[X*d] has shifted away from an initial position.

5. The receiver of claim 4 wherein the timing indicator utilizes correlations E[X*d] calculated at three indices around an initial peak position k which is established during an initial training of a modem connection.

6. The receiver of claim 4 wherein the timing indicator utilizes correlations E[X*d] calculated as the ensemble average of M products involving X(n) and d(n), with M being a block length providing reliable and timely correlation results.

7. The receiver of claim 1 wherein the adaptive equalizer includes a delay line and wherein, in a Trellis coded signal system where a set delay is involved in the decision logic, the delay line in the adaptive equalizer is expanded to include a delay corresponding to the set delay so that a delayed version of X(n) is used in calculating the correlations E[X*d] as well as in updating the adaptive equalizer taps.

8. A method for recovering a data signal d(n) from a complex baseband signal, the data signal having a transmitter symbol rate, the method comprising the steps of:

sampling the complex baseband signal at a fixed sample clock rate substantially equal to twice the transmitter symbol rate to generate baseband samples x(n);

processing the samples x(n) in time coordination with the fixed sample clock rate;

filtering the samples x(n) using a fractionally spaced adaptive equalizer with adjustable taps including a leading tap, a trailing tap and middle taps between the leading tap and the trailing tap to generate equalized output samples y(n);

down-sampling by a factor of two by discarding every other sample of y(n) to generate candidate data samples y'(n);

extracting the data samples d(n) from y'(n) at a receiver symbol rate which equals the sample rate of y'(n);

shrinking the leading and the trailing taps of said adaptive equalizer to zero while updating the middle taps of the adaptive equalizer in response to an error signal representative of the difference between d(n) and y'(n) so that the mean-squared error is minimized;

utilizing correlations E[X*d] of the baseband signal samples x(n) and the extracted data samples d(n) for providing a timing indicator output signal indicating the speed of the receiver symbol rate relative to the transmitter symbol rate, where $X=X(n)=[x_0, x_{-1}, x_{-2}, \ldots, x_{-N}](n)$ is a vector of N baseband samples in the delay line of the adaptive equalizer; and initiating timing recovery events to advance or retard the equalized output samples y(n) by shifting the adaptive equalizer taps left or right and by advancing or retarding the equalizer output in response to the timing indicator output signal whereby the receiver symbol rate is increased or decreased to correspond to the transmitter symbol rate without introducing any jitter in the equalized output samples y(n).

9. The method of claim 8 comprising the step of shrinking the leading and the trailing taps to zero while updating the middle taps of the adaptive equalizer after each timing recovery event so that the leading and the trailing taps are zeros before the next timing recovery event occurs.

10. The method of claim 8 comprising the step of shrinking the leading and the trailing taps to zero at a preset rate such that the introduced noise in the equalized output samples y(n) is smaller than noise caused by updating the middle taps of the adaptive equalizer.

11. The method of claim 8 comprising the step of outputting a signal to activate the timing recovery when the amplitude peak of the calculated correlations E[X*d] has shifted away from an initial position.

12. The method of claim 11 comprising the step of utilizing correlations E[X*d] calculated at three indices around an initial peak position k which is established during an initial training of a modem connection.

13. The method of claim 11 comprising the step of utilizing correlations E[X*d] calculated as the ensemble average of M products involving X(n) and d(n), with M being a block length providing reliable and timely correlation results.

14. The method of claim 8 wherein, in a Trellis coded signal system where a set delay is involved in the decision logic, buffering the baseband samples to include a delay corresponding to the set delay so that a delayed version of X(n) is used in calculating the correlations E[X*d] as well as in updating the adaptive equalizer taps.

* * * * *